(12) United States Patent
Zhao et al.

(10) Patent No.: US 8,482,548 B2
(45) Date of Patent: Jul. 9, 2013

(54) ELECTRONIC DEVICE WITH INFRARED TOUCH PANEL AND METHOD FOR CONFIGURING THE INFRARED TOUCH PANEL

(75) Inventors: Xin Zhao, Shenzhen (CN); Zu-Pei He, Shenzhen (CN); Han-Che Wang, Taipei Hsien (TW); Xiao-Guang Li, Shenzhen (CN); Ruey-Shyang You, Taipei Hsien (TW); Kuan-Hong Hsieh, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 548 days.

(21) Appl. No.: 12/871,833

(22) Filed: Aug. 30, 2010

(65) Prior Publication Data
US 2011/0096029 A1    Apr. 28, 2011

(30) Foreign Application Priority Data
Oct. 23, 2009    (CN) .......................... 2009 1 0308707

(51) Int. Cl.
*G06F 3/042*    (2006.01)
*G06F 3/041*    (2006.01)

(52) U.S. Cl.
USPC .................... 345/175; 345/173; 178/18.01

(58) Field of Classification Search
USPC .................... 345/175, 173; 178/18.01
See application file for complete search history.

(56) References Cited

U.S. PATENT DOCUMENTS

| | | | |
|---|---|---|---|
| 2002/0075243 A1* | 6/2002 | Newton | 345/173 |
| 2002/0118177 A1* | 8/2002 | Newton | 345/173 |
| 2008/0297487 A1* | 12/2008 | Hotelling et al. | 345/173 |
| 2010/0277437 A1* | 11/2010 | Shu | 345/175 |

* cited by examiner

*Primary Examiner* — Ariel Balaoing
(74) *Attorney, Agent, or Firm* — Altis Law Group, Inc.

(57) ABSTRACT

A configuration method includes the following steps: Controlling the display unit to display visual information, determining whether the visual information includes one or more touch icons, and determining if the display areas are displaying the touch icons, if yes, determining which infrared lines correspond to the display areas. Then determining which infrared emitters and which infrared receivers form the infrared lines, and turning on the determined infrared emitters and infrared receivers, finally, turning off the other infrared emitters and infrared receivers. The invention also provides an electronic device with an infrared touch panel.

9 Claims, 4 Drawing Sheets

ELECTRONIC DEVICE WITH INFRARED TOUCH PANEL AND METHOD FOR CONFIGURING THE INFRARED TOUCH PANEL

RELATED APPLICATIONS

Relevant subject matter is disclosed in a copending application entitled, "ELECTRONIC DEVICE WITH INFRARED TOUCH PANEL AND TOUCH INPUT METHOD THEREOF", filed Aug. 30, 2010 Ser. No. 12/871,832, and assigned to the same assignee as named herein.

BACKGROUND

1. Technical Field

The present disclosure relates to electronic devices with touch panels and, particularly, to an electronic device with an infrared touch panel and a method for configuring the infrared touch panel.

2. Description of Related Art

Nowadays, electronic devices equipped with touch panels are very popular. Infrared matrix type touch panels are commonly used. A conventional infrared matrix type touch panel has infrared emitters and infrared receivers that are arranged on four sides of the panel to produce infrared rays in the shape of very close cross stripes on the panel. When an object touches a spot on the panel, the object blocks an infrared ray passing through the touched spot, and the position information of the touched spot is determined by detecting which infrared ray is blocked In a conventional infrared matrix type touch panel, all of the infrared emitters and infrared receivers are in a working state when an electronic device is turned on. Under some conditions, if less icons are displayed, correspondingly less touch points may be touched, if all of the infrared emitters and infrared receivers are in a working state an extra burden may be added to the electronic device and thus can be a waste of energy. The phrase "touch icon" means a graphic user interface (GUI) element that can be displayed and is capable of triggering a function in response to user's touch.

Therefore, it is desirable to provide an electronic device with infrared touch panel to overcome the above-mentioned limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
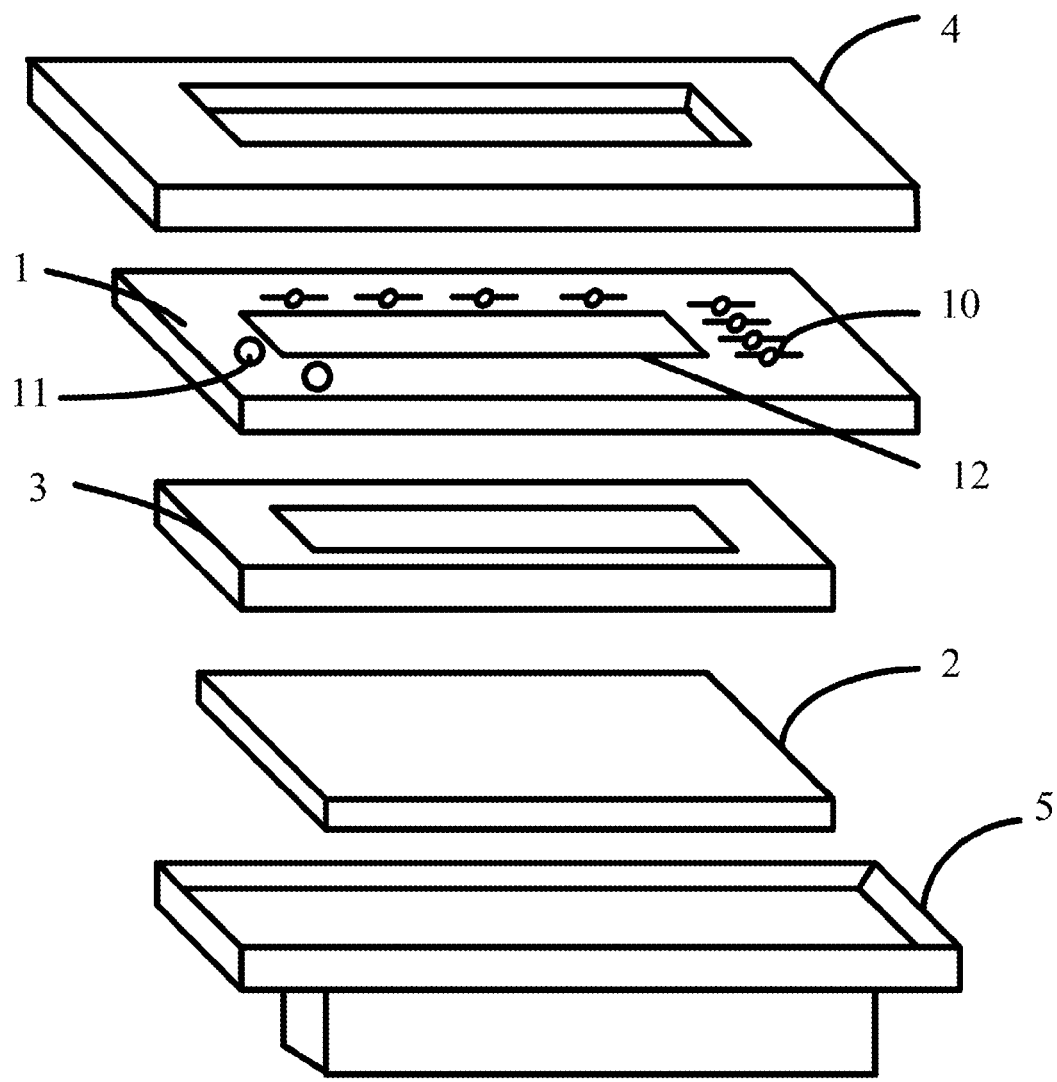
FIG. 1 is an exploded view of an electronic device with an infrared touch panel, according to an exemplary embodiment.

Referring to FIG. 1, an electronic device 100 includes an infrared touch panel 1, a processing unit 2, a display unit 3, a frame 4, and a cover 5. The frame 4 and the cover 5 cooperatively form a space to accommodate the infrared touch panel 1, the display unit 3, and the processing unit 2. The processing unit 2 is connected to the infrared touch panel 1 and the display unit 3. The infrared touch panel 1 includes a number of infrared receivers 10, at least one emitter 11, and a circuit board 12. In the embodiment, the circuit board 12 is substantially rectangular. The infrared receivers 10 and the at least one infrared emitter 11 are set on the circuit board 12.

Figure 2:
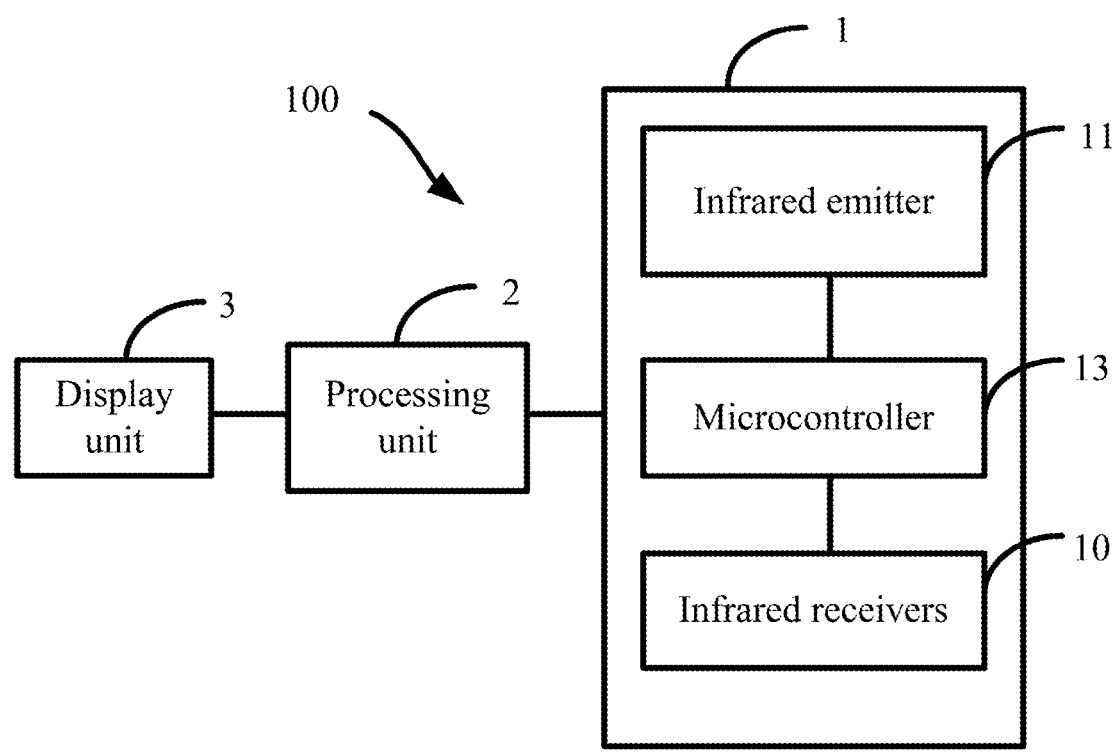
FIG. 2 is a block diagram of the electronic device of FIG. 1, in accordance with an exemplary embodiment.

Referring also to FIG. 2, the infrared touch panel 1 also includes a microcontroller 13 set on the circuit board 12. The microcontroller 13 is connected to the infrared receivers 10 and the at least one infrared emitter 11, and is configured to control the at least one infrared emitter 11 to send infrared signals to the infrared receivers 10, thus infrared lines corresponding to the infrared signals are formed between the at least one infrared emitter 11 and the infrared receivers 10. The microcontroller 13 is also configured to determine that whether an object, such as a finger or a stylus, blocks an infrared line. In the embodiment, if one infrared receiver 10 does not receive an infrared signal from the infrared emitter 11, then the microcontroller 13 determines an object has blocked the infrared line corresponding to the infrared signal.

Figure 3:
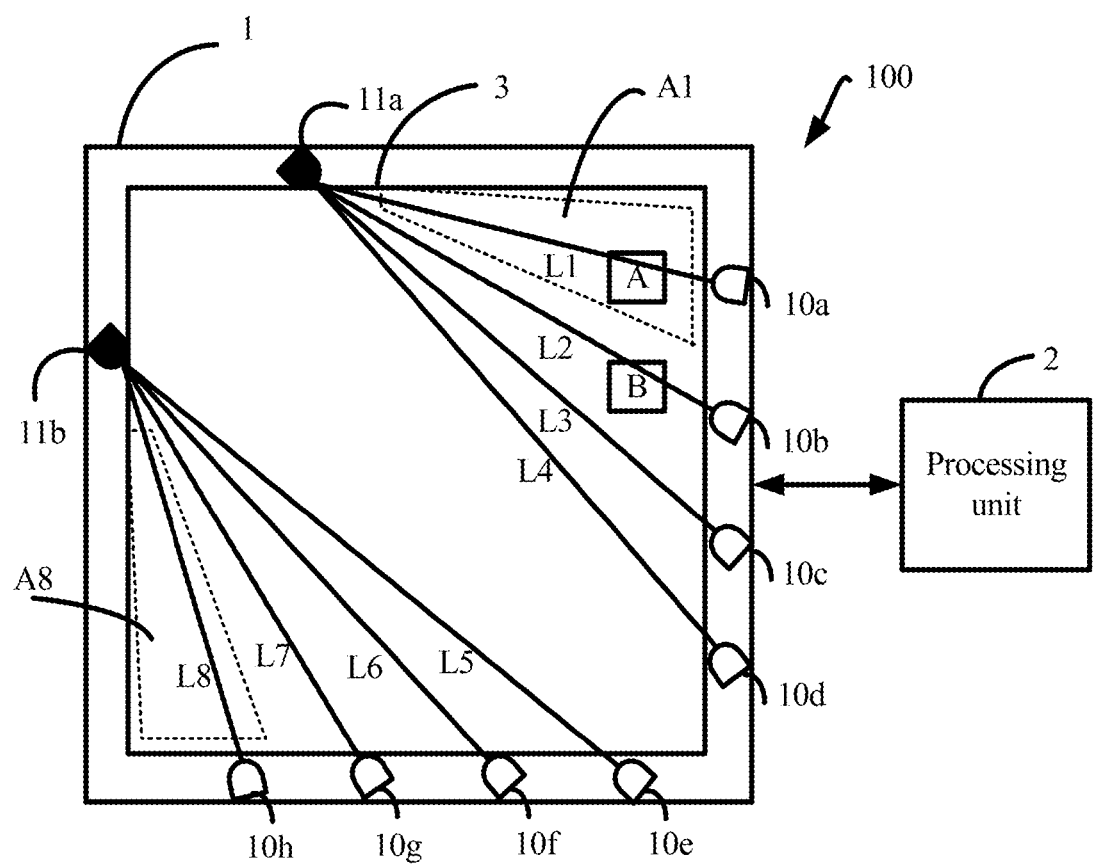
FIG. 3 is a schematic view of the electronic device of FIG. 1.

Referring also to FIG. 3, in the embodiment, the number of the at least one infrared emitters 11 is two, and the number of the infrared receivers 10 is eight. Hereinafter, the two infrared emitters are referred to as infrared emitters 11a and 11b, and the eight infrared receivers 10 are referred to as infrared receivers 10a~10h. In the embodiment, the infrared emitters 11a and 11b are respectively set at the left side and at the upper side of the circuit board 12 close to the top left corner of the circuit board 12. The eight infrared receivers 10a~10h are set at the bottom side and the right side of the circuit board 12 and are distributed uniformly. The infrared emitter 11a is capable of transmitting infrared signals to the infrared receiver 10a~10d, thus four infrared lines L1~L4 are formed between the infrared emitter 11a and the four infrared receivers 10a~10d. The infrared emitter 11b is capable of transmitting infrared signals to the four infrared receivers 10e~10h, thus four infrared lines L5~L8 are formed between the infrared emitter 11b and the four infrared receivers 10e~10h. The numbers and the arrangement of the infrared emitters 11 and the infrared receivers 10 can vary according to need. For example, the number of the at least one infrared emitter 11 may be one, and the number of the infrared receivers 10 may be ten. The infrared emitter 11 sends infrared signals to the infrared receivers 10, forming ten infrared lines between the infrared emitter 11 and the ten infrared receivers 10.

The processing unit 2 is configured for controlling the display unit 3 to display visual information. In the embodiment, the display unit 3 is divided into eight display areas corresponding to the eight infrared lines L1~L8. For each display area, only one infrared line passes through it. For example, as shown in FIG. 3, display area A1 corresponds to the infrared line L1 and only the infrared line L1 passes through the display area A1. The display area A8 corresponds to the infrared line L8 and only the infrared line L8 passes through the display area A8. The processing unit 2 is further configured for determining whether the visual information displayed on the display unit 3 includes at least one touch icon. If the processing unit 2 determines that the visual information includes one or more touch icons, the processing unit 2 determines which of the infrared lines pass through the one or more touch icons. Then determines which of the infrared emitters 11a or 11b and which of the infrared receivers 10a~10d form the one or more determined infrared lines.

In the embodiment, each display area only displays one touch icon. When the processing unit 2 determines that the visual information includes at least one icon, the processing unit 2 then determines in which display area the icon is displayed, and determines which infrared line is corresponding to the display area.

In the embodiment, when the processing unit 2 determines which of the infrared emitters 11a and 11b and which of the infrared receivers 10a-10h form the one or more determined infrared lines, the processing unit 2 sends a configuration instruction including the information of the determined infrared emitters 11 and the infrared receivers 10 to the microcontroller 13. The microcontroller 13 turns on the determined infrared emitters 11 and the infrared receivers 10, and turns off the other infrared emitters 11 and the infrared receivers 10 when receiving the configuration instruction. For example, as shown in FIG. 3, if the processing unit 2 determines the visual information displayed on the display unit 3 includes two touch icons A and B. The processing unit 2 determines the display areas corresponding to the touch icons A and B, the two infrared lines L1 and L2 corresponding to the two display areas, and then determines that the infrared emitter 11a and the infrared receivers 10a and 10b are forming the infrared lines L1 and L2. The processing unit 2 turns on the infrared emitter 11a and the infrared receivers 10a and 10b then turns off the infrared receivers 10c-10h and infrared emitter 11b. Therefore, the electronic device 100 can avoid power waste by turning off unnecessary infrared emitters 11 and infrared receivers 10.

The processing unit 2 is further configured for determining a display area touched by a user, and determining a touch icon displayed on the display area, and executing the function of the touch icon. For example, if the processing unit 2 determines the icon displayed on the display area that is touched by the user is an email icon, the processing unit 2 executes email function.

In the embodiment, the processing unit 2 determines which display area a user touches and which touch icon is touched on the display area in the following steps. The processing unit 2 checks whether the microcontroller 13 detects an infrared signal from the infrared receiver 10 or not. If the microcontroller 13 detects an infrared receiver 10 does not receive the infrared signal, the processing unit 2 further determines that which of the infrared emitter 11 is corresponding to the infrared receiver 10 that does not receive the infrared signal, and determines that the infrared line between the infrared receiver 10, which does not receive the infrared signal and the corresponding infrared emitter 11, is blocked. The processing unit 2 determines the display area corresponding to the infrared line, and then determines the touch icon displayed on the display area accordingly. In the embodiment, because the infrared emitter 11a sends the infrared signals to the infrared receivers 11a-11d and the infrared emitter 11a sends the infrared signals to the infrared receivers 11e-11h, then the processing unit is capable of determining the infrared emitter 11 corresponding to the infrared receiver 10.

Figure 4:
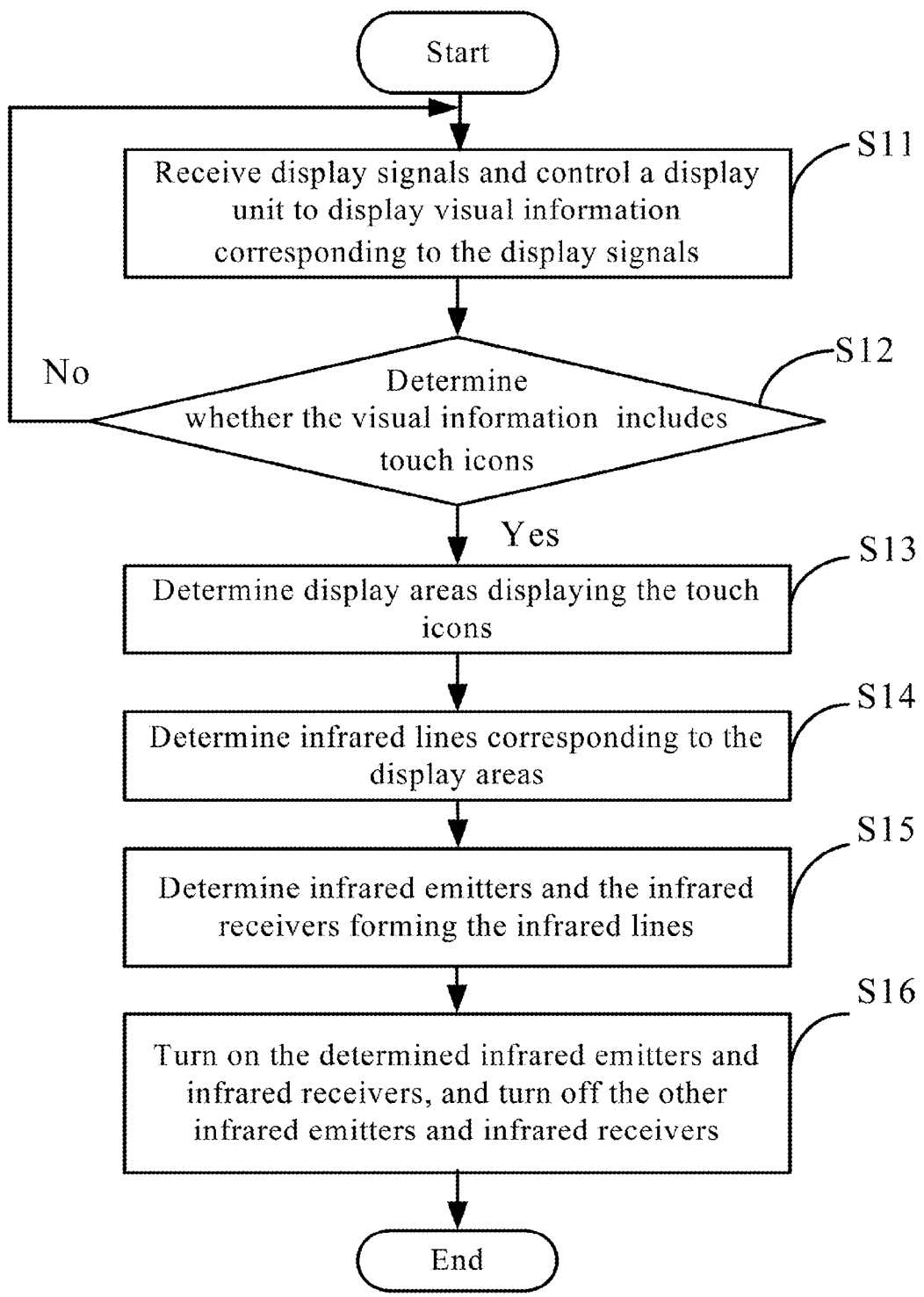
FIG. 4 is a flowchart illustrating a configuration method applied in the electronic device of FIG. 1, in accordance with an exemplary embodiment.

FIG. 4 is a flowchart illustrating a configuration method applied in an electronic device with an infrared touch panel in accordance with an exemplary embodiment.

In step S11, the processing unit 2 controls the display unit 3 to display visual information.

In step S12, the processing unit 2 determines whether the visual information includes touch icons.

If the processing unit 2 determines that the visual information does not include touch icons, the process returns to step S11. Otherwise, in step S13, the processing unit 2 determines the display areas displaying the touch icons.

In step S14, the processing unit 2 determines the infrared lines corresponding to the display areas.

In step S15, the processing unit 2 determines the infrared emitters 11 and the infrared receivers 10 forming the infrared lines, and sends a configuration instruction including the information of the determined infrared emitters 11 and infrared receiver 10 to the microcontroller 13.

In step S16, the microcontroller 2 turns on the determined infrared emitters 11 and the infrared receivers 10, and turns off the other infrared emitters 11 and infrared receivers 10 when receiving the configuration instruction.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An electronic device comprising:
   an infrared touch panel, comprising:
      at least one infrared emitter to emit infrared signals;
      a plurality of infrared receivers to receive infrared signals from the infrared emitters; and
      a microcontroller connected to the at least one infrared emitter and the infrared receivers, and configured for controlling the at least one infrared emitter to emit the infrared signals to the infrared receivers to form a plurality of infrared lines;
   a display unit divided to a plurality of display areas, each display area corresponding to a different infrared line; and
   a processing unit, configured for controlling the display unit to display an visual information and determining at least one of the plurality of display areas displaying at least one touch icon if the visual information comprises one or more icons, determining at least one infrared emitter and at least one infrared receiver corresponding to the at lest one display area, and sending a configuration instruction including the information of the at least one determined infrared emitter and the at least one infrared receiver to the microcontroller, informing the microcontroller to turn on the at least one determined infrared emitter and the at least one determined infrared receiver, and turn off the rest of the at least one infrared emitter and the rest of the plurality of infrared receivers; further configured for determining a display area touched by a user, and determining a touch icon displayed on the display area, and executing the function of the touch icon.

2. The electronic device according to claim 1, wherein when the processing unit determines the at least one display area displaying the at least one touch icon, the processing unit further determines the at least one infrared line corresponding to the at least one display area, and then determines the at least one infrared emitter and at least one infrared receiver form the at least one determined infrared line accordingly.

3. The electronic device according to claim 1, wherein the processing unit determines a display area touched by a user and a corresponding touch icon displayed on the display area comprises following steps: determining whether the microcontroller detects an infrared receiver which does not receive the infrared signal; determining which infrared emitter is corresponding to the infrared receiver; and determining that the infrared line formed between the infrared receiver which does not receive the infrared signal and the corresponding infrared emitter is blocked if the microcontroller detects an infrared receiver does not receive the infrared signal; determining the display area corresponding to the infrared line, and determining that the touch icon displayed on the display area is the corresponding touch icon.

4. The electronic device according to claim 3, wherein each of the display areas is configured to display one touch icon, when the processing unit determines the display area, the touch icon displayed on the display area is determined accordingly.

5. The electronic device according to claim 1, wherein the number of the at least one infrared emitter is two, and the plurality of infrared receivers comprises two set of infrared receivers, one of the infrared emitters emits infrared signals to the first set of infrared receivers to form a first plurality of infrared lines, the other of the infrared emitters emits infrared signals to the second set of infrared receivers to form a second plurality of infrared lines.

6. The electronic device according to claim 1, wherein the number of the at least one infrared emitter is one, the infrared emitter emits infrared signals to the plurality of infrared receivers to form a plurality of infrared lines.

7. The electronic device according to claim 1, further comprising a front frame and a back cover; the infrared touch panel, the display unit, and the processing unit are received between the front frame and the back cover in sequence.

8. A configuration method applied in an electronic device with an infrared touch panel, the electronic device comprising at least one infrared emitter, a plurality of infrared receivers, and a display unit divided into a plurality of display areas, the at least one infrared emitter emitting infrared signals to the plurality of infrared receivers to form a plurality of infrared lines, the method comprising:

controlling the display unit to display visual information;

determining whether the visual information comprising one or more touch icons;

determining display areas displaying the touch icons if the visual information comprises one or more icons;

determining infrared lines corresponding to the display areas;

determining the one of the at least one infrared emitter and the infrared receivers of the plurality of the infrared receivers forming the infrared lines;

turning on the determined infrared emitter and infrared receivers, and turning off the rest of the at least one infrared emitter and the rest of the plurality of infrared receivers.

9. The configuration method according to claim 8, further comprising:

determining an infrared line is blocked when the infrared receiver does not receive the infrared signal;

determining the display area corresponding to the blocked infrared line;

determining the touch icon displayed on the display area; and executing the function corresponding to the touch icon.

\* \* \* \* \*